March 6, 1962 — W. E. FORSTHOFF ETAL — 3,023,878
SELECTIVE CONVEYOR SYSTEM
Filed Oct. 19, 1960 — 3 Sheets-Sheet 1
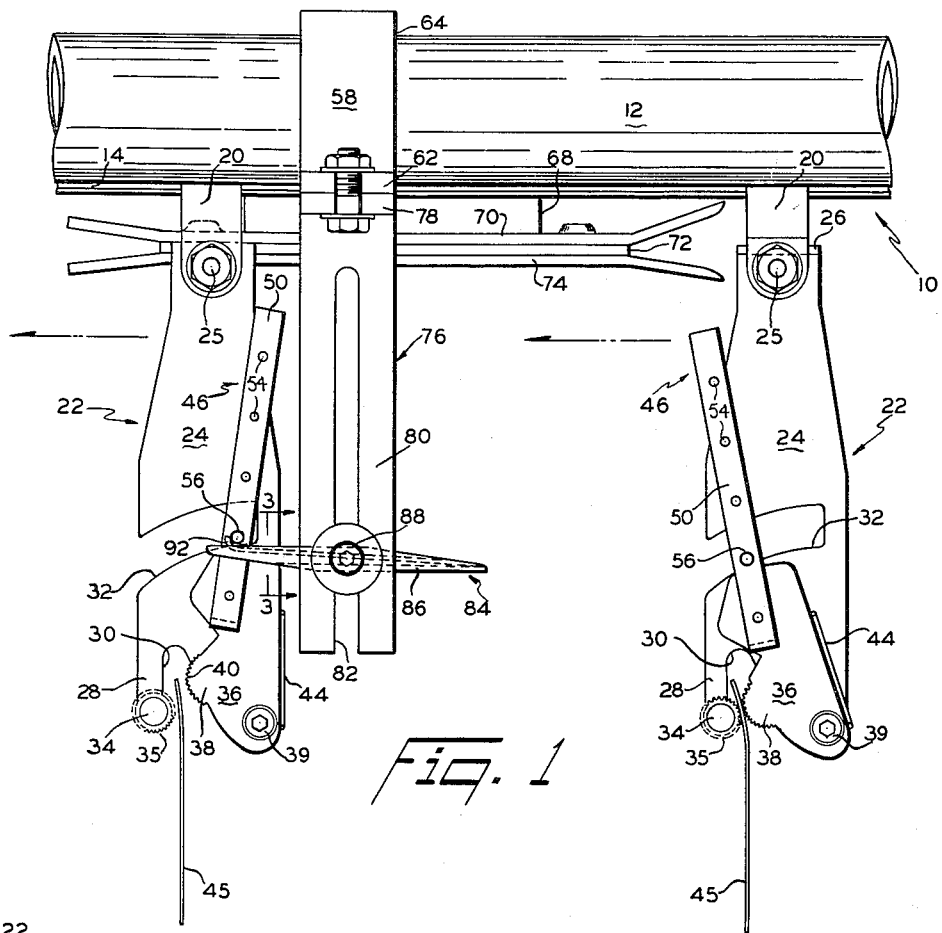
Fig. 1
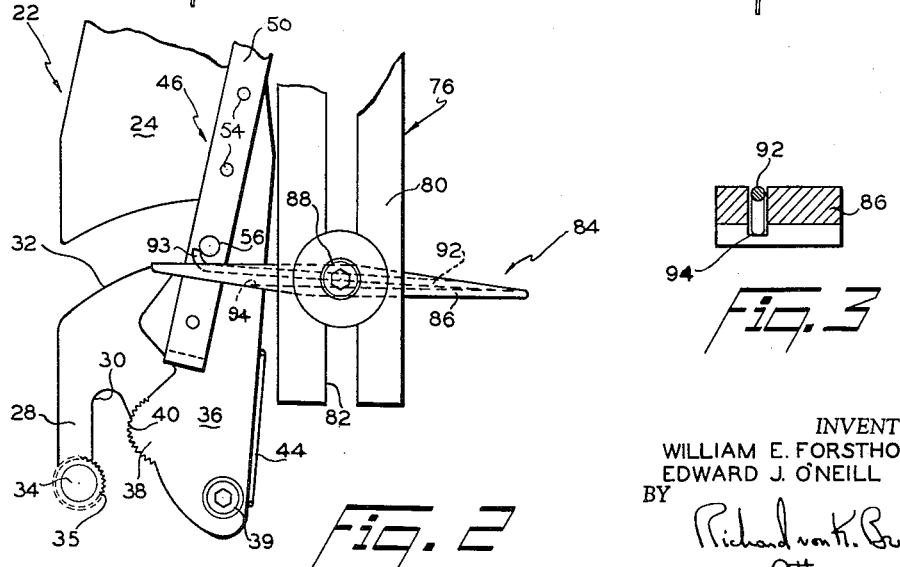
Fig. 2
Fig. 3
INVENTORS.
WILLIAM E. FORSTHOFF
EDWARD J. O'NEILL
BY
Richard von K. Bruns
Attorney March 6, 1962 W. E. FORSTHOFF ETAL 3,023,878
SELECTIVE CONVEYOR SYSTEM
Filed Oct. 19, 1960 3 Sheets-Sheet 2

INVENTORS.
WILLIAM E. FORSTHOFF
EDWARD J. O'NEILL
BY
Richard von K. Burns
Attorney March 6, 1962 W. E. FORSTHOFF ET AL 3,023,878
SELECTIVE CONVEYOR SYSTEM
Filed Oct. 19, 1960 3 Sheets-Sheet 3

INVENTOR.
WILLIAM E. FORSTHOFF
EDWARD J. O'NEILL
BY
Atty.

United States Patent Office 3,023,878
Patented Mar. 6, 1962

3,023,878
SELECTIVE CONVEYOR SYSTEM
William E. Forsthoff and Edward J. O'Neill, Syracuse, N.Y., assignors to Syracuse Supply Co., Syracuse, N.Y.
Filed Oct. 19, 1960, Ser. No. 63,692
9 Claims. (Cl. 198—38)

This invention is a continuation-in-part of copending application Ser. No. 836,822, filed August 28, 1959, now abandoned by the applicants. The invention disclosed herein relates generally to conveyor systems, and has particular reference to an improved system—together with the components and combinations thereof—for transporting or conveying articles throughout a circuit and for selectively discharging the articles at predetermined stations. More specifically, the conveyor system of the invention is particularly adapted for transporting sheet material articles, although it need not be confined to such use.

The system contemplated by the invention utilizes a conveyor operable through a predetermined path having a series of discharge stations equipped with mechanism for automatically unloading article supporting units or carriers attached to the conveyor. The unloading mechanism is arranged to act selectively in conjunction with structure carried by the article carriers to effect the discharge or unloading of a carrier. Thus, articles or sheet material delivered to the carriers can be automatically discharged or unloaded at pre-selected stations through proper adjustment of the unloading mechanism at the station. With this arrangement, carriers having material for deposit at a particular station will be discharged by the unloading mechanism at that station, while other carriers will advance beyond that station to stations having unloading mechanisms in different positions of adjustment with respect to a common datum point.

In equipment of the type described, it is desirable to pivotally suspend the article supporting units or carriers from the conveyor and to be able to supply articles to them at any point along the conveyor path for delivery to a particular station. The carriers can be color coded or otherwise designated to indicate at which stations they will be unloaded, and the unloading mechanism at any given station will be adjusted for engagement with a selectively positioned tripping element on the carriers designated for that station to effect the unloading. However, in order to ensure positive unloading of the carrier, it is advisable to provide structure in the vicinity of the discharge station for preventing pivotal movement of the carrier body as it proceeds through the station.

With the foregoing and other considerations in view, the broad objective of the present invention is to provide a selective carrier system that is versatile and efficient, and at the same time is economical to operate.

A more specific object of the invention is to provide a novel article supporting unit or carrier wherein loading and unloading of the unit can be accomplished easily and without employing components necessitating expensive construction or unusual strength.

Another object of the invention is to provide an unloading mechanism for the article carrier which is positive in operation and economical in construction.

A further object of the invention is to provide a conveyor system of the character described which is adapted to serve a relatively large number of unloading stations using a simple arrangement of parts.

Another object of the invention is to provide a conveyor system of the character described which may be loaded at any point along the conveyor path.

Still another object of the invention is to provide a conveyor system of the character described wherein the article carriers are provided with positive gripping means for releasably retaining the articles to be carried thereby.

A still further object of the invention is to provide a conveyor system of the character described wherein the article carriers are pivotally secured to the conveyor, and positive means are provided to hold the carrier body against pivotal movement in the vicinity of an unloading station.

Another object of the invention is to provide a conveyor system of the character described wherein the article carriers can be tripped from either side of the conveyor path.

A further object of the invention is to provide a conveyor system of the character described wherein the article carriers can be loaded by simply thrusting the material to be carried between the gripping portions thereof, the loading taking place while the conveyor is moving.

Still another object of the invention is to provide a conveyor system of the character described which enables a uniform and continuous flow of material between widely spread points in an industrial plant or office.

Other objects and advantages of the invention will become apparent from the following detailed description thereof read in conjunction with the accompanying drawings which illustrate a representative embodiment of the invention for the purpose of disclosure.

In the drawings:

FIGURE 1 is a side elevation of a portion of a conveyor system embodying the invention, illustrating the progress of two article carriers as they advance to and beyond a discharge station;

FIGURE 2 is an enlarged, fragmentary side elevation of an article carrier and a portion of the unloading mechanism, illustrating the action involved in unloading the carrier;

FIGURE 3 is a transverse section through the unloading mechanism taken substantially along line 3—3 of FIGURE 1;

Figure 4:
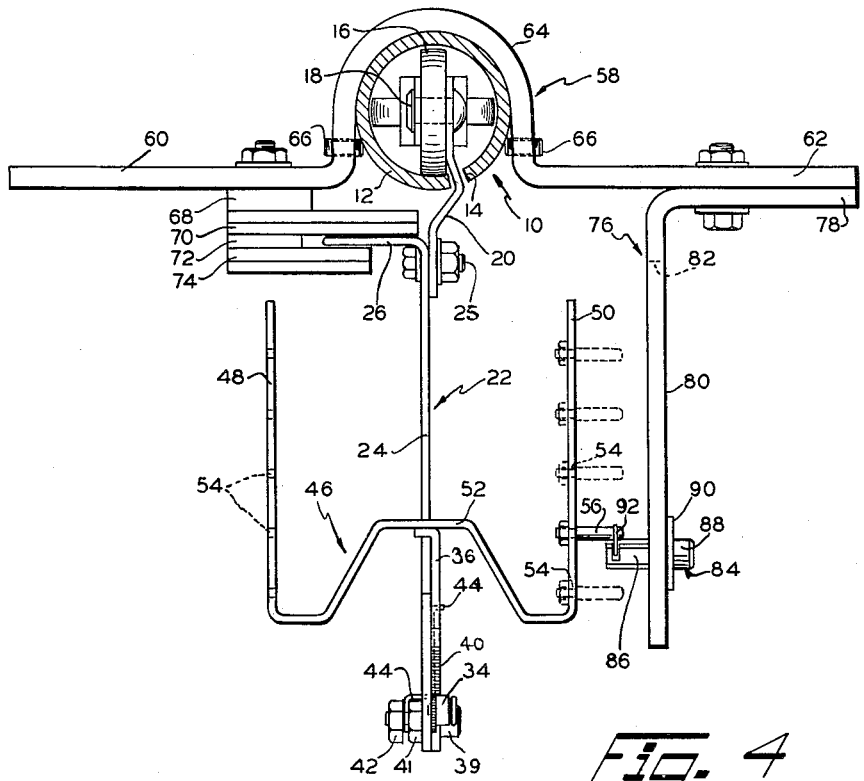
FIGURE 4 is a view normal to the view illustrated in FIGURE 1 looking towards the left side thereof.
Figure 5:
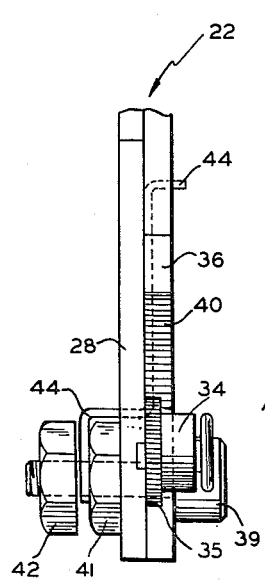
FIGURE 5 is an enlarged, detailed view corresponding to the lower part of FIGURE 4.

Referring now to the drawings, wherein like reference numbers designate the same part in each of the views, 10 generally indicates a conveyor which may be installed in a commercial establishment such as an industrial plant or large office where it is desired to transport articles for selective delivery to a plurality of discharge stations. The type of conveyor shown can be run vertically as well as horizontally or on an incline, and can turn on a small enough radius to follow substantially any desired path. The conveyor itself is a commercially available product and therefore does not constitute a part of the present invention except to provide a moving support for the article carriers, and it will be apparent as the description proceeds that other conveyors could be substituted for this purpose.

The conveyor 10 includes a tubular track 12, having a slot 14 extending throughout its length, and a series of spaced, interconnected rollers 16 mounted in the track, see FIGURE 4. The rollers form load carrying trolleys, and a suitable drive means (not shown) is provided to move the roller chain through the path or circuit determined by the confined track 12. Connected to an axle 18, extending centrally through the roller 16, is a mounting hanger 20 arranged to extend downwardly through the slot 14 in the tubular track. The roller is mounted by suitable bearings on its axle 18 to enable it to rotate about the axle as it moves through the track.

For the purpose of transporting articles along the path travelled by the conveyor, a plurality of article carriers, generally indicated at 22, are secured at uniformly spaced intervals to the load carrying trolleys of the conveyor. In accordance with the invention, each carrier 22 includes a main body portion 24, the upper part of which is pivotally connected as at 25 to a hanger 20 so that the carrier will normally hang vertically from the conveyor regardless of the path taken thereby. A horizontal flange or lip portion 26 is provided at the upper end of the carrier body portion for a purpose to be presently described. The lower part of the body portion 24 is provided with a projecting leg 28 arranged to form a recess 30 with the remainder of the body portion. Centrally of the body portion there is an arcuate recess 32 for a purpose to be later explained.

Mounted on the projecting leg 28 is a disc member 34 having a knurled peripheral surface 35 adapted to grasp and retain articles delivered to the carrier. Assisting member 34 in the retention of the articles is a lever 36 pivotally connected to the lower end of the body portion 24. Lever 36 is provided with an arcuate projection 38 having a knurled surface 40 adapted, in conjunction with the surface 35, to releasably retain articles inserted in the recess 30 of the carrier.

A bolt 39, serving to pivotally connect the lever 36 to the body portion 24, is provided with a threaded shank portion. Retaining nut 41 secures the bolt to the body portion in a manner to permit lever 36 to rotate about an unthreaded portion of the bolt shank. A second nut 42 is mounted on the threaded shank and serves to retain one end of a spring 44. The spring is arranged so that its opposite end engages the rear edge of lever 36 and urges it into a position causing engagement of the knurled surfaces 35 and 40. To load the unit it is only necessary to slide the article between the engaged knurled surfaces. The article 45 illustrated in FIGURE 1 is sheet material such as a paper or letter which it is desired to deliver to one of a plurality of discharge stations, as will be described more fully hereinafter.

To accomplish unloading of the carrier 22, structure carried thereby is engaged by unloading mechanism at a selected discharge station. This structure includes a lever actuating arm 46 secured to the lever 36. The arm 46, as best shown in FIGURE 4, is in the form of a modified W and includes two upstanding pin supporting legs 48 and 50 connected by an intermediate section 52 fixed substantially at its midpoint to the lever. A series of spaced apertures 54 is provided in each upstanding leg, and a tripping element or pin 56 is selectively mounted in one of these apertures. The arcuate recess 32 in the carrier body is provided to accommodate the intermediate or connection section 52 of the arm 46 when the latter and the lever 36 are rocked relative to the body portion, see FIGURES 1 and 2. Pivotal movement of the arm 46 is effected by the unloading mechanism at the discharge station.

One of the features of the invention is the manner of providing at each discharge station supporting structure for the unloading mechanism and the means for stabilizing the carrier at the station. This supporting structure comprises a strap 58 having flat opposed arm portions 60 and 62 which extend outwardly from a central track engaging section 64 secured to the track 12 as by set screws 66. Mounted on the end portion 60 of the strap 58 is an assembly comprising a spacer block 68, upper plate 70, spacer plate 72 and lower plate 74. The plates 70 and 74 have outwardly flared end portions as shown in FIGURE 1 to receive the flange 26 on the carrier 22 within the space or track formed between the plates, see FIGURE 4. Thus, as the carrier advances past a discharge station, pivotal movement of the carrier body is prevented thereby ensuring that the lever 36 will be rocked by the unloading mechanism and not the entire carrier.

The unloading mechanism is mounted on a depending support 76 which is connected through a flange portion 78 of the arm 62 of the track engaging strap 58. The vertical portion 80 of the support is provided with an elongated slot 82 extending upwardly from the lower end thereof. The unloading mechanism itself, which is generally indicated at 84, includes a bar 86 adjustably connected to the support by means of a screw 88 and washer 90, the screw passing with a free fit through the slot 82 and being threaded into the bar. The bar 86, together with a resilient spring 92 located in a longitudinal groove 94 in the upper surface of the bar, constitute a trip means engageable with a carrier pin 56 to effect pivotal movement of actuating arm 46 which in turn rocks lever 36 against the action of spring 44 and effects the release of any article held between the knurled surfaces 35 and 40.

Considering the operation of the apparatus described, articles such as papers are loaded into the article carriers at any point along the conveyor path by simply sliding or thrusting them between the knurled surfaces of the carriers. The conveyor system is particularly well adapted for routing letters, orders, invoices, etc. around a large office or industrial plant, and the individual carriers may be color coded or otherwise designated to indicate at which stations they will be unloaded. Thus, one group of carriers can be painted green to indicate the shipping department, another group can be painted yellow to indicate the accounting department, etc. so that if, for example, a sheaf of orders is to be sent to shipping, it can be inserted in any green carrier at any point along the conveyor path since these carriers will automatically be unloaded at that department.

Since, in the embodiment of the invention shown, there are five apertures 54 in each of the arms 48, 50, it will be apparent that there are ten possible locations for the tripping pin 56, and thus that ten different stations can be served by the system. Obviously, a greater or less number of apertures could be provided. Using the example cited just above, it can be assumed that the carrier shown in FIGURE 4 is painted green to designate the shipping department and that all carriers so designated will have their tripping pins mounted in the second aperture from the bottom on the upstanding leg 50 of the actuating arm 46. The unloading mechanism at the shipping department discharge station will then be adjusted to the proper elevation on its support 76 for engagement with these pins to effect discharge at the station. Other carriers having their tripping pins in any of the other apertures 54 obviously will not be tripped at the shipping department station but will pass on to their own stations where the unloading mechanism will be adjusted to an elevation corresponding to the pin location. When the tripping pins are mounted in one of the apertures 54 of the upstanding leg 48 rather than leg 50, the unloading mechanism will, of course, be mounted on the left side of the carrier rather than on the right as shown in FIGURE 4, the depending support 76 being secured to the strap arm 60 in such case.

After the carrier has been loaded, it proceeds to the station equipped with an unloading mechanism located at the proper level for engagement with pin 56 on the carrier. As the carrier enters the station, flange 26 is received in the pivoted stabilization means 70, 74. Initial engagement between the pin 56 and bar 86 occurs as the pin rides upwardly along the upper surface of bar 86, note FIGURE 1. This type of cam action occurs because the screw 88 holding the bar 86 on the support 76 is arranged at substantially the same level as the pin 56 on the carrier. This places the forward or leading end of bar 86 slightly below the pin so that the desired engagement is obtained. Travel along the inclined upper surface of bar 86 by pin 56 initiates rotational movement of arm 46, which movement is accommodated by the recess 32 in the carrier body. Since the lever comprising lever 36 and its extension arm 46 are inclined forwardly of the pivot 39, upward movement of the pin 56 induces rearward movement of the arm 46. The magnitude of rotational movement of arm 46 necessary to separate the projection 38 of lever 36 from the disc member 34 is assured as the hooked end portion 93 of resilient member 92 engages the pin 56. The parts then assume the position shown on the left side of FIGURE 1. The resistance created by engagement of hook 93 imparts an additional horizontal component to the force acting on pin 56. Continued movement of the carrier causes depression of spring 92 into the groove 94 as indicated in FIGURE 2 so that the pin rides over the hook 93, and the arm 46 and lever 36 are then returned to the position shown at the right side of FIGURE 1 under influence of the spring 44.

Referring now to FIGURES 6-9, a modified form of article carrier 122 is shown including a body portion 124 generally similar to that shown in FIGURE 1. A horizontal flange portion 126 is provided for engaging the pivoted stabilization means 70, 74, and the arcuate recess 132 provides clearance for the rearward motion of article release lever 146.

Figure 9:
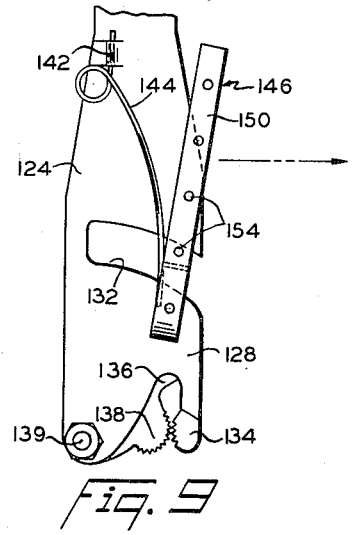
FIGURE 9 is a fragmentary side elevation of the article carrier of FIGURE 6 as viewed from the other side thereof and showing a modified form of release lever return spring.

The projecting leg 128 of body 124 is provided with a thickened integral portion 134 having a knurled peripheral surface 135 opposite the knurled surface 140 of the arcuate projection 138 of the lever 136 which is pivotally connected at 139 to the lower end of body portion 124. A torsion spring 144, best seen in FIGURE 9, is mounted in a boss 142 in body portion 124 on the side opposite the lever 136.

Figure 7:
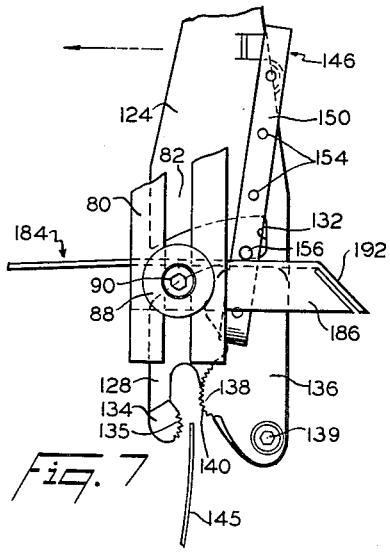
FIGURE 7 is a fragmentary side elevation of the parts of FIGURE 6 positioned as the article carrier is unloaded.
Figure 6:
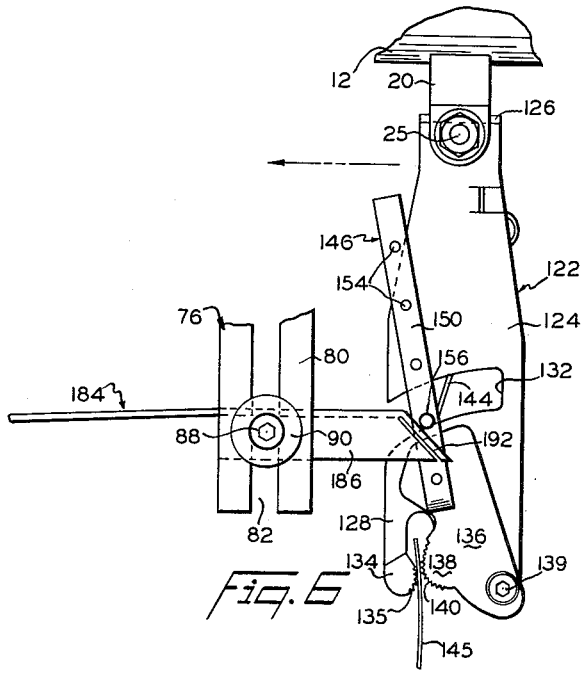
FIGURE 6 is a fragmentary side elevation similar to the portion shown at the left of FIGURE 1, showing a modified form of article carrier and unloading mechanism, the parts being in normal position prior to unloading.
Figure 8:
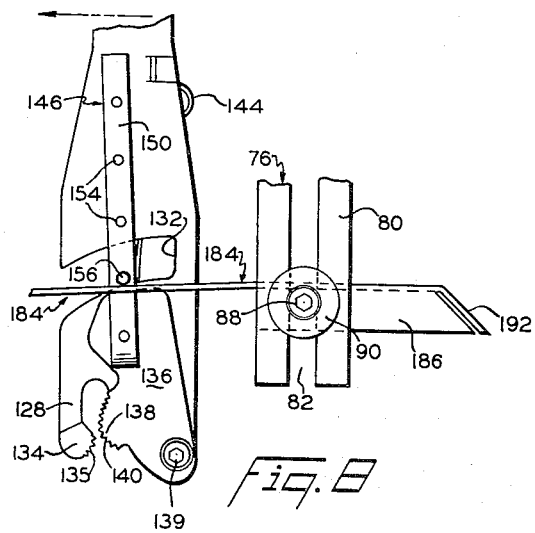
FIGURE 8 is a fragmentary side elevation of the parts of FIGURE 6 positioned as the article carrier leaves the unloading station.

Mounted on the support 76 is the unloading track bar 184 adjustably connected in slot 82 by the screw 88 and washer 90, there being a clamping nut (not shown) on the other side of the depending flange 186 of the bar 184. As best seen in FIGURE 6, the rearward portion of the track bar 184 is provided with an upwardly inclined tripping or cam portion 192 adapted to meet and cam rearward the tripping pin 156 mounted in one of the apertures 154 of the arm 146 for rocking the lever 136 against spring 144 to effect the release of an article 45 held between the knurled faces 135 and 140 (FIGURE 7). The upper surface of the track bar 184 is inclined slightly downward forward of the flange 186, to allow the arm 146 to return forward as the carrier 122 moves past the vertical portion 80 of support 76, as shown in FIGURE 8.

In operation the carrier 122 and unloading mechanism 184 is much the same as hereinbefore described. After the carrier 122 has been loaded by inserting the paper or other article between the knurled surfaces 135 and 140, the carrier proceeds to the station equipped with unloading mechanism located at the proper level for engagement with the pin 156 on the carrier.

As the carrier 122 enters the station, flange 126 is received in the pivoted stabilization means 70, 74. Pin 156 first meets the tripping cam 192 and arm 146 is rotated rearwardly about the pivot 139 and the article 45 is released. As arm 146 and lever 136 rotate rearwardly with respect to the carrier body 124, the pin 156 rises above the level of the top of the track 184 as shown in FIGURE 7. As the carrier proceeds past the unloading mechanism, pin 156 rides on the track bar 184 and is slowly allowed to fall, as shown in FIGURE 8 until the surfaces 135 and 140 of the article gripping device again meet.

From the foregoing description, it will be apparent that the invention provides an extremely versatile conveyor system by means of relatively simple, economical structure. As will be apparent to those familiar with the art, the invention can be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a conveyor system including a load carrying trolley and supporting track for said trolley: a sheet material carrier pivotally connected adjacent its upper end to said trolley so as to normally depend therefrom, said carrier comprising a main body and a lever, said body having a horizontally projecting flange at the upper end thereof and forward and rearward pendant portions at the bottom thereof, said lever being pivotally connected to said rearward body portion, gripping means on said lever forward of its pivotal connection, coacting gripping means on said forward body portion, means acting on said lever to bias its gripping means into engagement with said body portion gripping means for retaining an article therebetween, movement actuating means on said lever including transversely spaced upstanding arm members and a tripping element selectively mounted in one of a plurality of locations on said arm members adapted to accommodate the element, and a plurality of article unloading stations fixed to said supporting track at predetermined points thereon, each station having spaced horizontally projecting plates secured to the track for receiving therebetween said horizontally projecting body flange, said plates having outwardly flared end portions, and each of said stations including a depending support and tripping means adjustably mounted on said support, the tripping means on at least one of said stations being positioned for engagement with said tripping element when said article carrier moves past the station, engagement of said tripping means and tripping element being operable to move said lever and its gripping means out of engagement with the gripping means on said carrier body portion to release an article supported by the carrier at the station, whereby said sheet material may be loaded on said carrier anywhere along said track by pushing the sheet between said gripping means and is automatically unloaded at said one station.

2. In combination, a movably mounted article carrier, means pivotally mounted on said carrier for controlling article retention on the carrier, actuating means operatively connected to said retention controlling means, said actuating means including an arm having a plurality of apertures therein, an obstruction element assembled in a pre-selected aperture, means providing a surface for engagement with said obstruction element, and resilient means mounted on said surface means and adapted to engage said obstruction element with force sufficient to cause movement of said actuating means and retention controlling means without substantially impeding the advance of said article carrier, said surface providing means including a groove in which said resilient means is mounted so as to normally project above the surface, said resilient means being adapted to be depressed below said surface in response to the action of the movably mounted carrier as it proceeds beyond said surface means.

3. In a system including a conveyor for the transportation of articles through a predetermined path including a plurality of stations for selectively discharging and receiving articles from the conveyor, carrier means operatively connected to the conveyor, said carrier means including a depending body portion having a projecting end portion remote from said conveyor, a disc member provided with a knurled periphery mounted on said projecting end portion, a lever pivotally connected to said body portion, said lever having a projecting portion presenting a knurled surface, means for biasing said lever to a position relative to the body portion so that the knurled surface releasably engages the knurled periphery of the disc member to receive and retain articles therebetween, an actuating arm rigidly secured to said lever, said arm having a plurality of spaced apertures therein, a pin selectively mounted in one of said apertures, a plurality of spaced supporting members positioned along the conveyor path, said members each having a slot extending subtsantially throughout its axial extent, article unloading means slidably mounted in said slot, means for securing said unloading means at any desired position along said slot, said unloading means including a bar offering a surface inclined with respect to the slot and the direction of travel of said carrier means for engagement with said pin, said inclined surface being provided with a groove, a resilient element having a pin engaging hook portion at one end thereof mounted in said groove and biased to normally extend over the inclined surface, said inclined surface and resilient element being positioned for engagement by said pin on the lever actuating arm to effect pivotal movement of the lever relative to the carrier body portion to release articles supported between said disc member and the knurled projection on the lever.

4. In a conveyor system including a load carrying trolley and supporting track for said trolley: a sheet material carrier connected adjacent its upper end to said trolley so as to normally depend therefrom, said carrier comprising a main body and a lever, said body having forward and rearward pendant portions at the bottom thereof, said lever being pivotally connected to said rearward body portion, gripping means on said lever forward of its pivotal connection, coacting gripping means on said forward body portion, means ating position lever to bias its gripping means to a forward position engaging said other gripping means for retaining an article therebetween, upstanding arms secured to said lever, a tripping element on one of said arms, said arms having a plurality of locations thereon for selectively positioning said element, said locations all being normally forward of the pivoted connection between said lever and said body, a plurality of article unloading stations supported at predetermined points along said track, a depending support and tripping means adjustably mounted thereon at each station, the tripping means on at least one of said stations being positioned for engagement with said lever tripping element when said article carrier moves past the station, said tripping means having a forwardly and upwardly inclined camming portion thereon for moving said tripping element upwardly and rearwardly with respect to said carrier for releasing said coacting gripping means for engagement with said article whereby said carrier may be automatically unloaded at said one station and sheet material may be thrust up between said gripping means at any point along said track.

5. Structure as defined to claim 4 having a pivoted connection between said carrier and trolley, said main body having a horizontally protruding flange, and said station having spaced plates secured to said track above and below said flange for receiving the flange therebetween for preventing pivotal movement of the body in the vicinity of the station, said plates having outwardly flared end portions for guiding said flange as the carrier enters the station.

6. Structure as defined in claim 4 wherein said upstanding arms comprise the outer legs of an upstanding W-shaped member secured to said lever at the center of the member transversely of the carrier, each leg having a plurality of holes at different levels each adapted to receive said tripping element whereby a maximum number of positions for said tripping element is provided.

7. In combination a movably mounted article carrier, means pivotally mounted on said carrier for controlling article retention on the carrier, actuating means operatively connected on said retention controlling means, said actuating means including an arm having a plurality of apertures therein, an obstruction element assembled in a pre-selected aperture, said obstruction element being forward, with respect to the direction of motion of said carrier, of said pivoted connection between said retention controlling means and said carrier, means providing a fixed, upwardly inclined surface in the path of said carrier for engagement with said obstruction element and adapted to engage said obstruction element with force sufficient to cause upward and rearward movement of said actuating means and retention controlling means, whereby said obstruction element is moved upward past said inclined surface without substantially impeding the advance of said article carrier.

8. In combination, a movably mounted article carrier, means pivotally mounted on said carrier for controlling article retention on the carrier, actuating means operatively connected to said retention controlling means, said actuating means including an arm having a plurality of apertures therein, an obstruction element assembled in a pre-selected aperture, means providing a surface for engagement with said obstruction element, a groove in said surface means, and resilient means mounted on said surface means in said groove, so as to normally project above said surface and adapted to engage said obstruction element with force sufficient to cause movement of said actuating means and retention controlling means without substantially impeding the advance of said article carrier, said resilient means being adapted to be depressed below said surface in response to the action of the movably mounted carrier as it proceeds beyond said surface means.

9. In a system including a conveyor for the transportation of articles through a predetermined path including a plurality of stations for selectively discharging and receiving articles from the conveyor, carrier means operatively connected to the conveyor, said carrier means including a depending body portion having a projecting end portion remote from said conveyor provided with a knurled periphery, a lever pivotally connected to said body portion, said lever having a projecting portion presenting a knurled surface, means for biasing said lever to a position relative to the body portion so that the knurled surface releasably engages the knurled periphery of said end portion to receive and retain articles therebetween, an actuating arm rigidly secured to said lever, said arm having a plurality of spaced apertures therein, a pin selectively mounted in one of said apertures, a plurality of spaced supporting members positioned along the conveyor path, said members each having a slot extending substantially throughout its axial extent, article unloading means slidably mounted in said slot, and means for securing said unloading means at any desired position along said slot, said unloading means including a bar offering a surface inclined with respect to the slot and the direction of travel of said carrier means for engagement with said pin, said actuating arm being inclined upward and forward of said pivotal connection of said lever and said carrier body portion, whereby said pin is raised by engagement with said inclined surface and said lever is moved to a released position, said bar offering a second surface forward of said first surface, reversely inclined from said first surface, whereby said pin is lowered and said lever is returned to article-retaining biased position after the carrier has passed said unloading means.

References Cited in the file of this patent

UNITED STATES PATENTS

| | | |
|---|---|---|
| 1,775,545 | Anderson | Sept. 9, 1930 |
| 1,864,114 | Angerpointer | June 21, 1932 |
| 2,336,551 | Kumler | Dec. 14, 1943 |
| 2,621,809 | Linville | Dec. 16, 1952 |

UNITED STATES PATENT OFFICE
CERTIFICATE OF CORRECTION

Patent No. 3,023,878                              March 6, 1962

William E. Forsthoff et al.

It is hereby certified that error appears in the above numbered patent requiring correction and that the said Letters Patent should read as corrected below.

Column 7, line 48, for "ating position" read -- acting on said --; line 65, for "for" read -- from --; column 8, line 16, for "on" read -- to --.

Signed and sealed this 26th day of June 1962.

(SEAL)
Attest:

ERNEST W. SWIDER
Attesting Officer

DAVID L. LADD
Commissioner of Patents